June 4, 1974 W. J. NEBE 3,814,607
CRYSTALLINE PHOTOPOLYMERIZABLE COMPOSITIONS WITH IMPROVED STORAGE LIFE
Filed Aug. 7, 1972
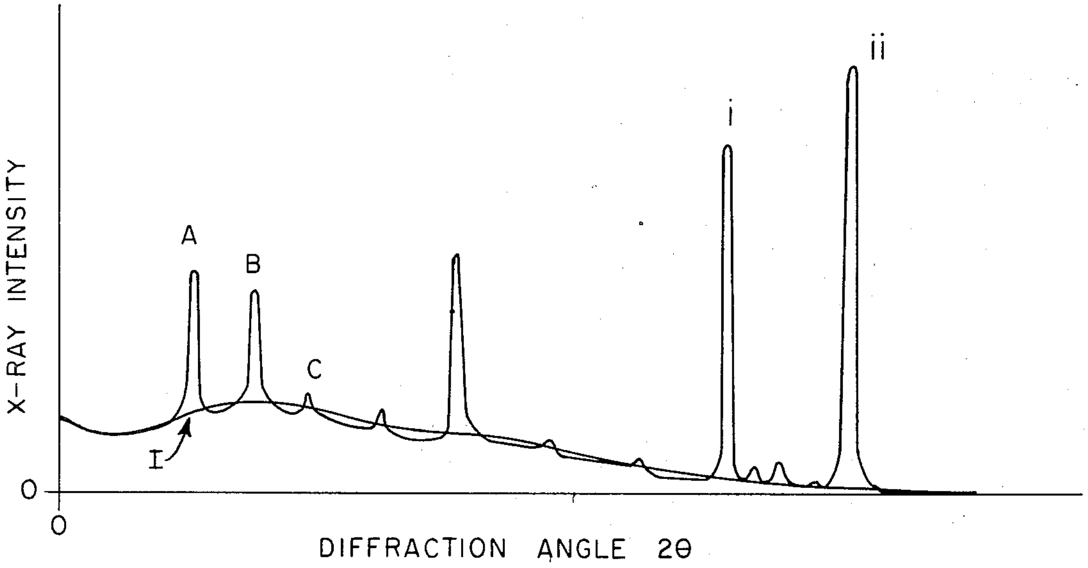

United States Patent Office 3,814,607

Patented June 4, 1974

3,814,607

CRYSTALLINE PHOTOPOLYMERIZABLE COMPOSITIONS WITH IMPROVED STORAGE LIFE

William John Nebe, Wilmington, Del., assignor to E. I. du Pont de Nemours and Company, Wilmington, Del.

Filed Aug. 7, 1972, Ser. No. 278,459
Int. Cl. G03c *1/70*
U.S. Cl. 96—115 P 11 Claims

ABSTRACT OF THE DISCLOSURE

Predominantly crystalline photopolymerizable compositions containing a reducing agent such as 4'-dimethylamino-3-propionyloxybenzophenone have excellent storage life without significant loss of photographic speed.

BACKGROUND OF THE INVENTION

Field of the invention

This invention relates to photopolymerization, especially to predominantly crystalline compositions characterized in having high photographic speed. The invention is specifically concerned with improving the storage life of the photopolymerizable compositions.

Description of the prior art

T. Chang and R. N. Fan, U.S. 3,549,367, describe the use of p-aminophenylketones as reducing agents coupled with hexaarylbisimidazoles in photographic systems containing an ethylenically unsaturated monomer. D. Fishman, in U.S. 3,552,973, describes the use of p-aminophenyl ketones as energy transfer agents to hexaarylbisimidazoles in light sensitive compositions. W. Hertler, commonly assigned Ser. No. 144,629, filed May 18, 1971, and now abandoned discloses the use of 4'-dimethylamino-4-acryloxybenzophenone as a reducing agent. It does not give extended shelf life in a crystalline photopolymerizable composition.

DESCRIPTION OF THE INVENTION

The invention is a substantially dry, predominantly crystalline photopolymerizable composition in the form of a thin layer ranging from about 1 micron to about 1 millimeter in thickness, having substantially homogeneously distributed therethrough closely arrayed crystals consisting essentially of at least one ethylenically unsaturated non-gaseous monomer capable of forming a polymer having a degree of polymerization of at least 10 by free-radical initiated, chain propagating, addition polymerization, and for each part by weight of monomer, 0.001 to 1 part by weight of an organic, light-sensitive, free-radical generating system free of aliphatic halogen which initiates and subsequently does not terminate the polymerization, at least one component of which has an active light absorption band with a molar extinction coefficient of 100 or more measured in hexane in the range of 3300 to 8000 A., said composition having a crystallinity index of at least 0.2 and containing 0.3 to 2% by weight of the total composition of an ester of the formula

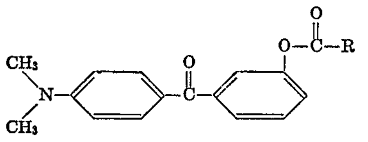

wherein R is an alkyl group having up to 6 carbon atoms.

As noted above, various compounds, mostly amines, have been employed as reducing agents when paired with hexaarylbisimidazoles, said paired compounds operating as initiators of vinyl polymerization. The novel amino esters of this invention function as reducing agents in the predominantly crystalline photopolymerizable compositions of this invention. Surprisingly, however, they also have been found to increase the storage stability of the compositions as to retention of their high speed of photopolymerization. Good shelf life of photographic chemicals and compositions is of obvious importance for practical application in the printing and photographic arts. The means by which the 4'-dimethylamino-3-alkanoyloxybenzophenones improve the shelf life of photopolymerizable compositions is not known for a certainty. One explanation, which should not be considered as limiting the invention, is that these novel esters act in some fashion to maintain the photocompositions in a favorable state of crystallinity or degree of crystallinity.

The compositions are characterized by excellent shelf life in that when exposed to light after extended storage the area of the composition receiving radiation is fully and clearly formed and separated by sharp boundaries from adjacent unexposed areas, that is, the image is clear and sharp and not blurred or "fogged." This clarity of image is accompanied by no substantial loss in photographic speed of the composition.

The compositions are wholly crystalline in their external aspects and are capable of rapid polymerization on exposure to relatively small amounts of light. By "substantially dry" it is meant that the compositions contain no resins or binders, and no liquid in the way that prior art compositions do, and for all practical purposes are dry to the touch. The molecules present in the interfacial regions are not necessarily in their crystalline state but have a certain mobility and from this point of view the compositions may be considered to contain liquid or liquid-like regions.

The crystals may be comprised of the monomer or of both monomer and free-radical generator. The free-radical generating system may be referred to hereafter as polymerization initiator or simply as initiator. It should be understood that in each case the disordered regions at the crystal interfaces contain molecules of both monomer and organic initiator in their noncrystalline state since it is believed the photoinitiated polymerization of the unsaturated compound occurs primarily in such disordered regions between the crystal faces.

The Figure is a schematic representation of a diffractometer graph for calculating the crystallinity index of the compositions of the invention.

The crystallinity index of the compositions of the invention should be at least 0.2, the upper limit ranging to infinity, and can be determined by the procedure set forth in H. P. Klug and L. E. Alexander, "X-Ray Diffraction Procedures," John Wiley & Sons, Inc., New York (1954), pp. 626–630. The index is computed from X-ray diffraction powder method data in the form of a scintillation counter intensity versus $2\theta$ graph obtained from a diffractometer where $\theta$ is the Bragg angle. The basic idea is that of comparing the diffracted energy of the bragg reflections (above the line I) to that of the noncrystalline scattering (below the line I).

The discrete Bragg reflections such as A, B and C etc. are superimposed on a broad background line I. The Bragg reflections are those peaks which have a width at halfheight less than 1° in $\theta$, thus excluding the very broad peaks which may be due to one or two dimensional order. The crystallinity index is defined as the area B under all of the Bragg reflections, but above the line I, divided by the area A under the line I, or $$X_c = \frac{B}{A}$$

Bragg reflections due to the aluminum substrate, such as i and ii in the Figure, are not to be considered in computing $X_c$. In computing these areas, the background radiation is to be excluded from consideration. For example the base line of the recorder can be adjusted so that it reads zero intensity with the X-ray source turned off.

To make the above calculation for $X_c$, the experimental setup must be as follows:

X-ray Diffractometer—Norelco Model No. 2
Sample thickness—10–1000 $\mu$m.
Substrate—aluminum plate
Diffraction conditions:
  Tube voltage—40 kv.
  Tube current—35 ma.
Time constant—2 seconds or less
Radiation—Cu $K_a$
Traverse speed—2°/minute
Monochromator—LiF curved crystal
Detector—Scintillation Counter, PHA, Hamner.

An example of determining the crystallinity index follows. The graph produced by the machine has the line I inscribed on it preferably by a person skilled in X-ray diffraction measurements. The line I defines the non-crystalline scattering on the X-ray intensity versus $2\theta$ plot. The area under I and between the verticals drawn at some point removed from zero, say $2\theta=10°$, and also at $2\theta=60°$, is determined with a planimeter. This is area A. Next the discrete X-ray diffractions extending above I are selected, those due to the aluminum substrate being ignored, and the area under each peak, as A, B, C, etc. is also determined with a planimeter. The sum of these areas is the area B. Where for a particular composition the area A is determined for example to be 423 sq. cm. and the area B is determined to be 259 sq. cm., $B/A$ yields a crystallinity index of 0.61.

The ethylenically unsaturated monomers useful in the invention are solid or liquid. Where solid monomers are used together with initiator systems, the solid monomers can have a melting point range of 25 to 100° C. Where a crystalline composition does not polymerize within a reasonable time when exposed to light at room temperature, as for example where relatively high melting monomers or initiators are used, it may be made to polymerize within a reasonable period of time by exposing the composition at an elevated temperature. The exposure temperature should not be so great however, as to reduce the crystallinity index of the composition below 0.2.

The speed may also be increased by an advantageous aspect of the invention where, for each part by weight of solid monomer, there is included 0.01 to 0.25 parts by weight of a nonpolymeric, normally liquid organic compound which does not inhibit the polymerization of the monomeric material and does not absorb so much of the incident light as to prevent the initiation of the polymerization by the free-radical generating system. The selected liquid organic compound can be present in low concentration and/or have a light absorption band which only partially overlaps the active light absorption band of the free-radical generating system. For example the overlap may be quite small, on the order of 5%, but may be as high as 20% or more, without preventing the initiation of the polymerization by the free-radical generating system. In other cases it will be advantageous to lower the concentration of the liquid or to select another liquid which has little or no overlap in the active light band involved. In certain cases the liquid component may be a polymerizable ethylenic monomer or, more generally, a polymerization initiator. It is to be understood that when such additional liquid component is used, the predominantly crystalline nature of the crystalline layer is not changed; that is, the crystalline layer is dry to the touch and wholly crystalline in all external aspects.

The additional liquid component makes it possible to use ethylenic monomers with a wider range of melting point. It should be kept in mind that the selected liquid component should be used in small amounts to insure that the final composition is predominantly crystalline at the temperature at which it is to be used.

Another aspect of the invention is that where, for each part by weight of monomer, there is included 0.01 to 250 parts by weight of a nonpolymerizable, crystalline organic solid which does not inhibit the polymerization of the monomeric material and also does not absorb the incident light to such an extent as to prevent the initiation of the polymerization by the free-radical generating system. The discussion above relative to the concentration and overlapping of an absorption band of the initiator by an absorption band of the liquid organic component applies to the nonpolymerizable crystalline organic solids as well.

The crystalline organic solid has a melting point range of 25° to 200° C. It is included to lower the melting point of the composition and/or to form all or part of the crystals which provide the crystal environment for the active disordered regions. Thus such crystalline solids may be used to reduce the amount of monomer which would otherwise form the crystals, to allow the use of liquid monomers and to provide water-soluble crystals when it is desired that the photopolymerizable composition is to be developable with water, etc. The use of a crystalline solid provides additional flexibility in that the amount of free-radical generating system may be increased; that is, for each part by weight of monomeric material, there can be used 0.001 to 5 parts by weight of free-radical generating system, provided that the free-radical generating system does not exceed 50% by weight of the combined weight of monomer, free-radical generating system and crystalline solid. The ability to use such crystalline solids allows the preparation of crystalline compositions with any desired set of characteristics.

The crystalline compositions may be exposed to light of 2000 to 8000 A. over a wide range of temperatures. Depending on the purpose involved, such temperatures may range from about −18° C. to about 80° C. and it should be kept in mind that the compositions should be predominantly crystalline at the temperature to be used. The total energy of irradiation, among other factors, determines the amount of polymer formed and the light flux determines the rate of polymerization. In general, light sources delivering 10 to 1000 $\mu$w./sq. cm. are employed. Judicious selection of monomer, initiator and additional component, if used, will insure the production of compositions having the prescribed characteristics.

Crystallinity may be obtained by any known procedure such as by casting from a solution and allowing the components to crystallize as the solvent evaporates.

The polymerizable ethylenically unsaturated compounds useful in the invention comprise a large variety of compounds. Those which boil above 90° C. and melt below 200° C. are generally used and it is preferred to employ compounds that melt from about 25° C. to about 100° C. or which boil within the range of 90°–200° C.

Preferred are monomers which are an acrylate ester of a hydroxybenzophenone or pentaerythritol, as for example, 3-acryloxybenzophenone, 4-acryloxybenzophenone, pentaerythritol di-, tri- and tetra-acrylate, and p-($\alpha$,$\alpha$-dimethylbenzyl)-phenyl acrylate.

The organic, light sensitive free-radical generating system which is free of aliphatic halogen is one which initiates the polymerization of the monomer and does not subsequently terminate the polymerization. Certain compounds are known to be polymerization initiators such as the quinones and compounds containing aliphatic halogen but unfortunately they also interfere with the polymerization at a later stage and hence such compounds are excluded. The word "organic" is used here and in the claims to designate compounds which contain carbon, and one or more of oxygen, hydrogen, nitrogen, sulfur and halogen but no metal.

The free-radical generating system absorbs light within the range of 2000 to 8000 A. and has at least one component that has an active light absorption band with a molar extinction coefficient of 100 or more within the range 3300 to 8000 A. "Active light absorption band" means a band of light which is active to produce the free radicals necessary to initiate the polymerization of the monomeric material. The free-radical generating system can comprise one or more compounds which directly furnish free radicals when activated by light. It can also comprise a plurality of compounds one of which yields the free radicals after having been caused to do so by a sensitizer which is activated by the light.

A large number of such compounds can be utilized in the practice of the invention and include Michler's ketone (4,4'-bis(dimethylamino)benzophenone), 4,4'-bis(diethylamino)benzophenone, 4 - acryloxy-4'-diethylaminobenzophenone, 4-methoxy - 4' - dimethylaminobenzophenone, benzophenone and other aromatic ketones; benzoin, benzoin ethers, e.g., benzoin methyl ether, benzoin ethyl ether, benzoin phenyl ether, methylbenzoin, ethylbenzoin; 2,4,5-triarylimidazole dimers such as 2-(o-chlorophenyl)-4,5-di-(m-methoxyphenyl)imidazole dimer, 2 - (o-fluorophenyl-4,5-diphenylimidazole dimer and the like disclosed in U.S. Pat. 3,479,185 and in British Pat. Specifications 997,396 published July 7, 1965 and 1,047,569 published Nov. 9, 1968.

As previously stated the added component is an organic liquid or solid depending upon the purpose for which it is added. Many compounds may be used such as hydrocarbons, amines, alcohols, and the like so long as they satisfy the requirements previously stated. Illustrative examples which may be cited include octadecanol, triethanolamine, stearic acid, cyclododecane, 1,10-decanediol, dimethylamino-benzonitrile, acetoneoxime, desoxybenzoin, naphthalene, N,N'-dimethylhexamethylenediamine, p-diethoxybenzene, 1,2-diphenylethane, biphenyl, dotriacontane, tetramethylurea, tributylamine, 2-dimethylaminoethanol, bibenzyl, biphenyl, pentamethylbenzene, 1,12-dodecanediol, 1,2-diphenoxyethane, octacosane, trichloroxylene, and cyclododecanol, etc.

A preferred group of solid compounds includes biphenyl, bibenzyl, pentamethylbenzene, octacosane, p-diethoxybenzene, diphenoxyethane, 1-octadecanol, 1-docosanol, cyclodecanol, 1,10-decanediol, and 1,12-dodecanediol.

The composition of the invention are exposed to light of wavelength in the 2000–8000 A. range. Suitable sources of such light, in addition to sunlight, include carbon arcs, mercury-vapor arcs, fluorescent lamps with ultraviolet radiation-emitting phosphors, argon glow lamps, electronic flash units and photographic flood lamps. Other fluorescent light sources such as the tracings on the face of a cathode ray tube may also be used. Where artificial light sources are used the distance between the photosensitive layer and the light source may be varied according to the light sensitivity of the composition and the nature of the photopolymerized polymer, that is, whether the composition is to be used for producing images or to cause bulk polymerization of the monomer.

The base material or support for the photoactive films of this invention may be any natural or synthetic material capable of existing in film or sheet form and can be flexible or rigid. Such supports may be metal sheets or foils, sheets or films of synthetic organic resins of all kinds, including vinyl and condensation polymers, heavy paper such as lithographic paper, and the like. Specific bases include: alumina-blasted aluminum, alumina-blasted "Mylar" polyester film, "Mylar" polyester film, polyvinyl alcohol-coated paper, cross-linked polyester-coated paper, nylon and glass. "Mylar" is a trademark of the Du Pont Co. for poly(ethylene terephthalate).

The length of time for which the compositions are exposed to light may vary upward from fractions of a second. The exposure time will vary, in part, according to the nature and concentration of the monomer and initiator and the type of light. Exposure can occur over a wide range of temperatures, as for example from −18° C. up to about 80° C. Preferred exposure temperatures range from 20° to 35° C. Flash exposure is also effective and many systems sufficiently approach silver emulsion speeds so as to permit projection exposure and thereby make possible photo-enlargement.

Imagewise exposure, for example in preparing printing plates, is conveniently carried out by exposing a layer of the photoactive composition to light through a process transparency, e.g., a process negative or positive (an image-bearing transparency consisting solely of substantially opaque and substantially transparent areas where the opaque areas are substantially of the same optical density, the so-called line or halftone negative or positive). Many of the systems of this invention are sufficiently fine grained as to reproduce continuous tone transparencies such as negative or positive transparencies of the type obtained by standard silver halide photography.

The exposed photosensitive layer is developed by removing the unpolymerized monomer and leaving behind only the polymeric replica of the original. The polymeric image may be developed by the well-known solvent washout procedure or by heating under conditions such that some or all of the components are vaporized leaving behind the photopolymer. The conditions of thermal development selected will depend upon the nature of the substrate, the volatility of the components to be removed, and the thermal stability of the components. In general, thermal development can be achieved by use of a hot air knife, by irradiation with a heat lamp, or by contact with a heated surface. It may be desirable in some cases to enhance volatility by applying a vacuum during application of heat. This method also permits recovery of unused components. Many of the low-melting monomers may be vaporized when the exposed plate is heated on a hot plate.

The invention provides photopolymerization compositions readily adapted to a variety of applications such as non-silver photography, storage and retrieval of information, formation of self-supported fibers and films, preparation of positive or negative transparent projection slides, lithographic plates, photoresists, application of decorative overlays or other coatings to almost any article. A process of adhesion if two substrates, one or both of which can be transparent, is useful for the application of protective coatings. This process can also be applied to joining opaque bodies; one or both parts to be joined are coated with the photoactive composition, exposed to light and quickly joined.

The photopolymerizable compositions of this invention can be adapted to positive-negative transfer assemblies, e.g., as described in U.S. 3,060,025 and U.S. 3,353,955, and to peel-apart assemblies composed of a substrate/predominantly crystalline composition/transparent cover, the latter having adherence on either the polymerized interlayer or for the nonpolymerized portion of the interlayer. The compositions can contain pigments if desired in order to increase the optical density of the photopolymer or to obtain any of the other advantageous effects of pigments known in the art.

The esters which are used in the invention appear to be new and may be prepared by the procedure illustrated in the preparation of 4'-dimethylamino-3-propionyloxybenzophenone.

EXAMPLE A

4'-dimethylamino-3-propionyloxybenzophenone

A benzene solution containing 3.2 g. (0.15 mol) of 4'-dimethylamino-3-hydroxybenzophenone (J. Chem. Soc. 642–50, 1932) and 1.49 g. of triethylamine was cooled to 5–10° C. and stirred while adding 1.46 g. of propionyl chloride. Stirring was continued for 3 hours during which time the triethylamine hydrochloride salt precipitated. The mixture was filtered and the filtrate concentrated to a thick liquid that did not crystallize. The crude product was diluted with ether and stirred with neutral alumina for 1 hour. The solution was filtered, the ether evaporated. This gave 4'-dimethylamino-3-propionyloxybenzophenone as a very viscous liquid, the structure of which was confirmed by infrared and nuclear magnetic resonance spectroscopy.

*Analysis.*—Calcd. for $C_{18}H_{19}O_3N$: C, 72.70; H, 6.4. Found: C, 72.27, 72.32; H, 6.55, 6.67.

By using other acyl chlorides such as acetyl chloride, butanoyl chloride, pentanoyl chloride and hexanoyl chloride in place of the propionyl chloride, other corresponding esters can be prepared.

SPECIFIC EMBODIMENTS OF THE INVENTION

The following examples are intended to be illustrative and not limitative of the invention. All parts are by weight except where otherwise stated.

The components listed under each example in the table below were dissolved in 15 ml. of chloroform and sprayed from 6" distance using a Binks Co. Model 59–1000/"A" air brush onto 5" x 5" aluminum plates. The coated plates were heated to 100° C. on a hot plate until the coatings melted, after which the compositions were allowed to crystallize.

The prepared plates were exposed to radiation from a medium pressure Mercury lamp delivering 20 μj./cm.²/sec. in increments of 1, 2, 4, 8, 16, 32 and 64 seconds (20 μj. to 1280 μj./sq. cm. total exposure).

Examples 1, 2 and 3 are representative of the invention. The data for Example 1 reveal that an image was produced upon exposure to 160 μj./cm.² immediately after preparation (0 weeks standing). After 8 and 27 weeks storage the amount of required light was the same. After 33 weeks the amount of light increased to 240 μj./cm.². In no case was blurring or fogging of the image observed. Similar results were obtained with Examples 2 and 3.

Control examples 4, 5 and 6 do not contain the saturated ester of the invention and either show fogging or a tremendous increase in the amount of light needed to produce an image.

| Components | Example (amounts in grams) | | | | | |
|---|---|---|---|---|---|---|
| | 1 | 2 | 3 | 4 | 5 | 6 |
| Diphenoxyethane | 0.852 | 0.852 | 0.852 | 0.850 | 0.852 | 0.852 |
| 2-o-chlorophenyl-4,5-di(m-methoxyphenyl)-imidazole dimer | 0.024 | 0.024 | 0.024 | 0.048 | 0.024 | 0.024 |
| 2-o-chlorophenyl-4,5-diphenylimidazole dimer | 0.024 | 0.024 | 0.024 | | 0.024 | 0.024 |
| 3-acryloxybenzophenone | 0.08 | | | 0.08 | 0.07 | |
| 4-acryloxybenzophenone | | 0.10 | 0.10 | | | 0.12 |
| Michler's ketone | | | 0.01 | | 0.01 | 0.01 |
| 2-mercaptobenzoxazole | | | | | 0.01 | 0.01 |
| 4'-dimethylamino-3-propionyloxybenzophenone | 0.01 | 0.01 | 0.01 | | | |
| 4'-dimethylamino-3-acryloxybenzophenone | | | | 0.01 | | |
| | Total exposure (μj./cm.²) to produce image/after standing (weeks) | | | | | |
| | 160/0 | 160/0 | 80/0 | 160/0 | 20/0 | 40/0 |
| | 160/8 | 160/19 | 160/22 | *160/13 | 320/4 | 160/4 |
| | 160/27 | 240/33 | 200/32 | | 640/26 | 1,280/26 |
| | 240/33 | 240/48 | | | | |
| | 240/48 | | | | | |

*Fogged.

The embodiments of the invention in which an exclusive property or privilege is claimed are defined as follows:

1. A substantially dry, predominantly crystalline photopolymerizable composition in the form of a thin supported layer ranging from about 1 micron to about 1 millimeter in thickness, having substantially homogeneously distributed therethrough closely arrayed crystals consisting essentially of at least one ethylenically unsaturated nongaseous monomer capable of forming a polymer having a degree of polymerization of at least 10 by free-radical initiated, chain propagating, addition polymerization, and for each part by weight of monomer, 0.001 to 1 part by weight of an organic, light-sensitive, free-radical generating system free of aliphatic halogen which initiates and subsequently does not terminate the polymerization, at least one component of which has an active light absorption band with a molar extinction coefficient of 100 or more measured in hexane in the range of 3300 to 8000 A., said composition having a crystallinity index of at least 0.2 and containing 0.3 to 2% by weight of the total composition of an ester of the formula

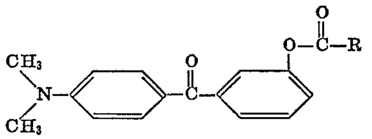

wherein R is an alkyl group having up to 6 carbon atoms.

2. A composition of claim 1 additionally containing for each part by weight of monomer, 0.01 to 250 parts by weight of a nonpolymerizable crystalline organic solid which melts in the range 25–200° C., does not inhibit the polymerization of the monomer, and does not absorb so much of the active incident light as to prevent the initiation of the polymerization by the free-radical generating system with the proviso that the free-radical generating system does not exceed 50% by weight of the combined weight of monomer, free-radical generating system and crystalline solid.

3. A composition according to claim 2 in which the said crystalline organic solid is 1,2-diphenoxyethane.

4. A composition according to claim 2 in which the said ester is 4' - dimethylamino - 3 - propionyloxybenzophenone.

5. A composition according to claim 2 in which the monomer is 4-acryloxybenzophenone.

6. A composition according to claim 2 in which the monomer is 3-acryloxybenzophenone.

7. A composition according to claim 2 in which the free-radical generator is 2 - o - chlorophenyl - 4,5-di(m-methoxyphenyl)imidazole dimer.

8. A composition according to claim 2 in which the free-radical generator is 2-o-chlorophenyl-4,5-diphenylimidazole dimer.

9. A composition according to claim 2 containing 3-acryloxybenzophenone, 4' - dimethylamino - 3-propionyloxybenzophenone, 1,2 - diphenoxyethane, 2 - o-chlorophenyl - 4,5 - di(m-methoxyphenyl)imidazole dimer and 2-o-chlorophenyl-4,5-diphenylimidazole dimer.

10. A composition according to claim 2 containing 4-acryloxybenzophenone, 4' - dimethylamino - 3-propionyloxybenzophenone, 1,2 - diphenoxyethane, 2 - o - chlorophenyl - 4,5 - diphenylimidazole dimer and 2-o-chlorophenyl-4,5-di(m-methoxyphenyl)imidazole dimer.

11. A composition according to claim 2 containing 4-acryloxybenzophenone, 4' - dimethylamino - 3-propionyloxybenzophenone, 1,2 - diphenoxyethane, 2 - o - chlorophenyl-4,5-diphenylimidazole dimer and 2-o-chlorophenyl-4,5-di(m-methoxyphenyl)imidazole dimer and 4,4'-bis(dimethylamino)benzophenone.

References Cited

UNITED STATES PATENTS

| | | | |
|---|---|---|---|
| 3,549,367 | 12/1970 | Chang et al. | 96—115 P |
| 3,661,588 | 5/1972 | Chang | 96—115 P |

RONALD H. SMITH, Primary Examiner

U.S. Cl. X.R.

96—35.1; 204—159.22, 159.23